Sept. 2, 1947.  K. A. LANG  2,426,937
CURRENT CONTROL APPARATUS
Filed July 2, 1945
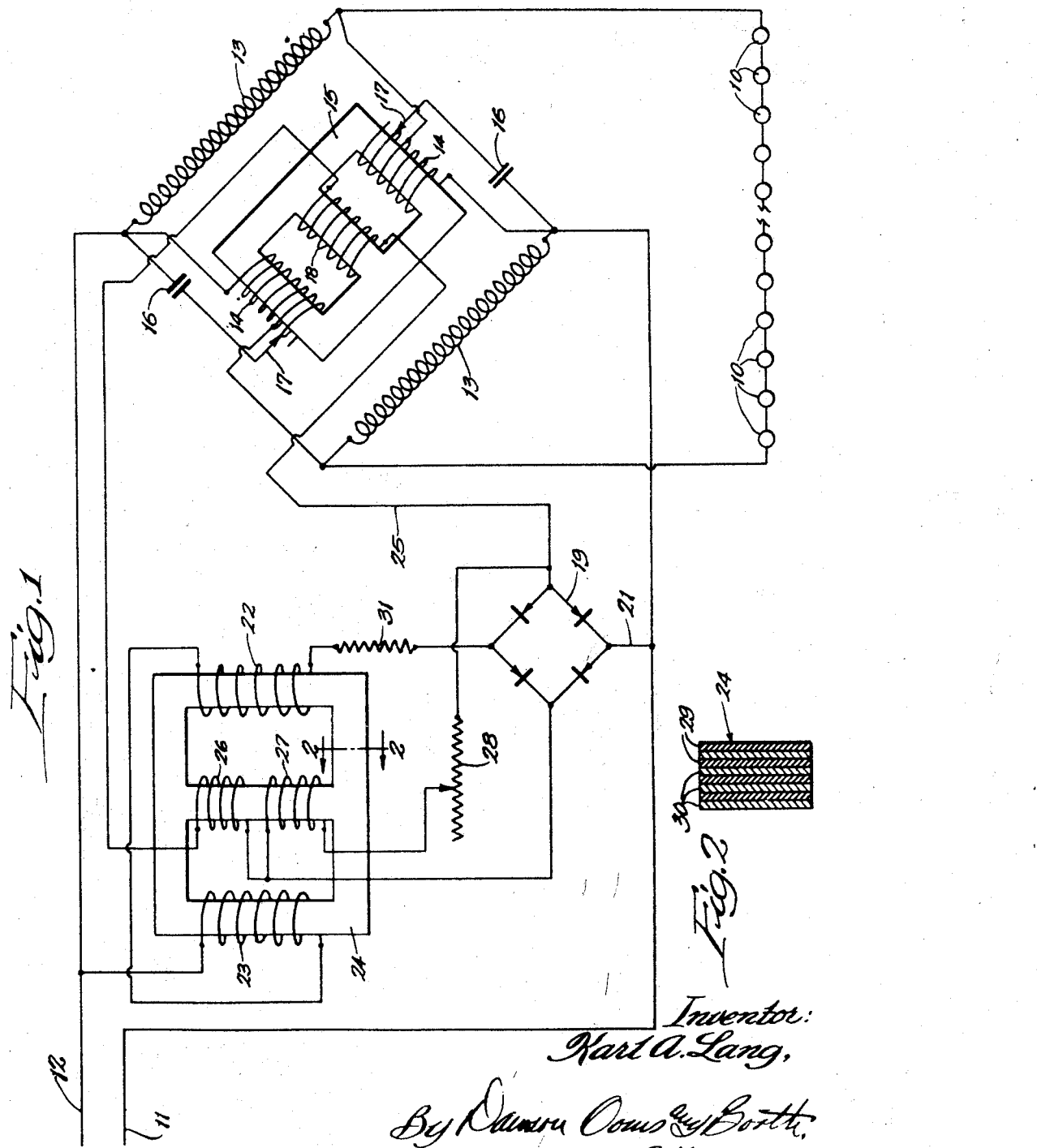
Inventor:
Karl A. Lang,
By Dawson Ooms & Booth
Attorneys.

Patented Sept. 2, 1947

2,426,937

UNITED STATES PATENT OFFICE 2,426,937

CURRENT CONTROL APPARATUS

Karl A. Lang, Glenview, Ill., assignor to Lindberg Engineering Company, Chicago, Ill., a corporation of Illinois Application July 2, 1945, Serial No. 602,842

8 Claims. (Cl. 171—119)

This invention relates to current control apparatus and more particularly to apparatus for supplying constant current to a load from an alternating current supply source which is subject to voltage fluctuations.

In my copending application Ser. No. 587,797, filed April 11, 1945, I have disclosed and claimed a current control apparatus which is corrected for voltage fluctuations in the supply source so that the current supplied to the load will remain substantially constant under all operating conditions.

One of the objects of the present invention is to provide a similar type of apparatus in which a sharper control is produced.

Another object is to provide current control apparatus which is corrected for supply voltage changes and in which the correction is amplified by a factor proportional to the amount of correction present.

In one construction a correcting current is supplied to the control apparatus in response to supply voltage changes and the amount of correcting current is varied by utilizing it to vary the saturation of a reactor which controls the correcting current.

Still another object is to provide current control apparatus in which the correction of the apparatus is compensated to prevent overcorrection in either direction.

These and other features of the invention will be seen from the following detailed specification read in connection with the accompanying drawings forming part thereof and in which—

Fig. 1 is a circuit diagram of one form of apparatus embodying the invention; and Fig. 2 is a partial section on the line 2—2 of Fig. 1.

The circuit shown is adapted to control the supply of current to a load shown as including a series of electric lamps 10 from an alternating current supply source including supply leads 11 and 12. In the apparatus according to the present invention, voltage from the supply leads is connected to the load circuit through a resonant type constant potential to constant current regulating device. This device includes a pair of reactors 13, one end of each of which is connected to one of the supply leads and the other end of each of which is connected to the load circuit.

The resonant type circuit is constructed in the manner more particularly described and claimed in my copending application Ser. No. 587,797 and as shown includes a pair of windings 14 on a common core 15 connected respectively across the reactors 13 in the form of a bridge circuit. Condensers 16 are connected across the windings 14 and may be variably connected to the windings by taps 17 so that the effective capacitance in the circuit can be adjusted. The core 15 carries a saturating winding 18 by which the saturation of the core can be varied to control the amount of current flowing through the windings 14 to maintain the output current constant, as more fully explained in my copending application Ser. No. 587,797.

Saturating current is supplied to the winding 18 by a rectifier 19 connected to one side by a wire 21 to the supply lead 11. The other input side of the rectifier is connected to the other supply lead 12 through reactance windings 22 and 23 in series. The windings 22 and 23 are carried by a core 24 of closed section and are so wound that they are of opposite polarity to produce a continuous flux path around the core.

The saturating winding 18 is directly connected through a wire 25 to one of the output corners of the rectifier 19 and at its opposite side is connected to the other output corner of the rectifier through a saturating winding 26 on the core 24. With this construction when the voltage in the supply source increases the voltage impressed across the rectifier will increase to increase the saturating current supplied to the windings 18 and 26. An increase of saturating current in the winding 26 increases the saturation of the core 24 thereby reducing reactance of the windings 22 and 23 further to increase the saturating current.

Thus a voltage change in the supply source produces a change in the saturating current in the winding 18 which is greater in proportion than the voltage change. By this means a relatively small change in supply voltage can produce a change in saturating current in the winding 18, which is fully sufficient to correct the resonant circuit so that the current supplied to the load will be maintained constant.

With the circuit as so far described there is a tendency to build up saturating current in the winding 26 to produce an overcorrection of the resonant circuit so that an increase in the supply voltage might actually result in a decrease in load current. To compensate for this tendency a compensating winding 27 is wound on the core 24 in a direction to oppose the winding 26. The winding 27 is connected across the rectifier output through a variable resistor 28 by which the amount of compensating current can be adjusted.

With the compensating winding present the same increase in output voltage of the rectifier which tends to increase the saturating current in the winding 26 produces a proportional increase in the opposing saturating current in the winding 27 to prevent excessive saturation of the core 24 and excessive correction of the resonant circuit. It will be apparent that the resistor 28 can be so adjusted as to produce exact correction so that the load current will be maintained constant regardless of supply voltage variations.

In addition to the compensating winding 27, or as an alternative thereto the core 24 may be so constructed as to have a relatively flat saturation curve so that it will not saturate quickly and will provide only a gradual change in the reactance of the windings 22 and 23. For this purpose the core may be formed as seen in Fig. 2 of laminations 29 formed of one magnetic material interleaved with laminations 30 of different magnetic material having different saturation characteristics.

By the combination of two or more different materials in this manner the overall saturation curve of the core 24 may be controlled substantially as desired so that the curve does not have a sharp knee. This effect as an alternative to or in addition to the compensating effect of the winding 27 serves to prevent overcorrection and enables the saturating current supplied to the winding 18 to be so controlled as to compensate exactly for voltage changes in the supply.

With certain types of rectifier the resistance of the rectifier circuit increases with temperature so that upon heating of the apparatus during use the saturating current supplied to the winding 18 tends to decrease as the temperature rises. To correct for this a resistor 31 is connected in series with the rectifier and is of such a character that it has a negative temperature coefficient. For example, a carbon pile resistor may be used whose effective resistance value decreases upon a rise in temperature. The resistor may be made of such a value and with such characteristics as to compensate exactly for increases in resistance of the rectifier so that the saturating current supplied to the winding 18 will be independent of temperature changes.

Having thus shown and described one embodiment of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What is claimed is:

1. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor and means connecting the saturating windings to the output of the rectifier.

2. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor and means connecting the saturating windings in series to the output of the rectifier.

3. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor, a compensating winding on the core of the last mentioned reactor opposing the saturating winding thereon, means connecting the saturating windings and the compensating winding to the output of the rectifier, and a variable impedance means connected to the compensating winding to control the current flow therein.

4. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor, a compensating winding on the core of the last mentioned reactor opposing the saturating winding thereon, means connecting the saturating windings in series across the output of the rectifier, means connecting the compensating winding across the output of the rectifier, and a variable resistor in series with the compensating winding.

5. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor, the core of the last mentioned reactor being formed of laminations of different materials whereby it has a relatively flat saturation curve, and means connecting the saturating windings to the output of the rectifier.

6. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier, a circuit including a cored reactor in series to connect the rectifier across the supply source, a saturating winding on the core of the last mentioned reactor, the core of the reactor being formed of laminations of different materials whereby it has a relatively flat saturation curve, a compensating winding on the core of the last mentioned reactor opposing the saturating winding thereon, means connecting the saturating and compensating windings to the output of the rectifier, and a variable resistor in circuit with the compensating winding.

7. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier connected to the saturating winding to supply it, and means including a resistor having a negative temperature coefficient connecting the rectifier to the supply source.

8. Current control apparatus comprising a pair of reactors adapted to have one end of each connected to an alternating current supply source and the other end of each connected to a load, a pair of inductively coupled windings on a core connected in a bridge circuit to the reactors, a capacitor connected across at least one of the windings, a saturating winding on the core, a rectifier connected to the saturating winding to supply it, means including a core reactor and a resistor having a negative temperature coefficient connecting the rectifier to the supply source, and a saturating winding on the core of the last mentioned reactor connected in series with the first named saturating winding.

KARL A. LANG.